United States Patent
Kwong (10) Patent No.: US 11,685,460 B2
(45) Date of Patent: *Jun. 27, 2023

(54) MULTI-MODAL MONOCOQUE STRUCTURE FOR MOTORCYCLES

(71) Applicant: Damon Motors Inc., Vancouver (CA)

(72) Inventor: Dominique Kwong, Coquitlam (CA)

(73) Assignee: Damon Motors Inc., Vancouver (CA)

( * ) Notice: Subject to any disclaimer, the term of this patent is extended or adjusted under 35 U.S.C. 154(b) by 73 days.

This patent is subject to a terminal disclaimer.

(21) Appl. No.: 17/243,475

(22) Filed: Apr. 28, 2021

(65) Prior Publication Data

US 2021/0380191 A1    Dec. 9, 2021

Related U.S. Application Data

(60) Provisional application No. 63/033,958, filed on Jun. 3, 2020.

(51) Int. Cl.
*B62K 11/02*    (2006.01)
*B62K 19/32*    (2006.01)
*B62K 19/24*    (2006.01)

(52) U.S. Cl.
CPC .............. *B62K 11/02* (2013.01); *B62K 19/24* (2013.01); *B62K 19/32* (2013.01)

(58) Field of Classification Search
CPC ......... B62K 11/02; B62K 19/24; B62K 19/32
See application file for complete search history.

(56) References Cited

U.S. PATENT DOCUMENTS

| | | | |
|---|---|---|---|
| 4,624,470 A | 11/1986 | Love | |
| 6,401,347 B1 | 6/2002 | Slates | |
| 7,070,374 B2 | 7/2006 | Womack | |
| 7,438,306 B2 | 10/2008 | Mrdeza et al. | |
| 7,546,894 B1 | 6/2009 | Glenn | |
| 7,922,130 B2 * | 4/2011 | Hawkins | F16L 3/243 52/480 |
| 8,181,981 B2 * | 5/2012 | Stenberg | B62K 11/04 280/281.1 |
| 8,277,158 B2 * | 10/2012 | Csik | F16B 37/046 411/111 |
| 8,567,030 B2 * | 10/2013 | Koch | F16B 2/12 52/717.03 |
| 9,079,631 B1 | 7/2015 | Costa | |
| 9,790,980 B2 | 10/2017 | Mccarthy et al. | |
| 9,868,488 B2 | 1/2018 | Hackl | |
| 10,518,837 B2 * | 12/2019 | Araki | B62K 25/04 |
| 11,292,548 B2 * | 4/2022 | Kwong | B62K 21/02 |

(Continued)

FOREIGN PATENT DOCUMENTS

EP    3339153 A2 *    6/2018    ............. B62K 19/32
FR    2624084    6/1989

*Primary Examiner* — Amy R Weisberg
*Assistant Examiner* — Hosam Shabara
(74) *Attorney, Agent, or Firm* — Polygon IP, LLP (57) ABSTRACT

A fastening system for attaching a component to the monocoque of a motorcycle. The fastening system promotes a plurality of riding configurations for the motorcycle. The fastening system includes an assembly of a track and a movable foot piece. The movable foot piece slides along and is locked in the track to secure the component to the track according to a desired riding configuration of the motorcycle. When the component is the headstock, the fastening system allows for a change in the rake angle.

21 Claims, 7 Drawing Sheets

(56) References Cited

U.S. PATENT DOCUMENTS

2005/0151346 A1\* 7/2005 James ................ B62K 25/02
 280/288
2006/0060405 A1 3/2006 Pender
2016/0288863 A1 10/2016 Hackl \* cited by examiner

MULTI-MODAL MONOCOQUE STRUCTURE FOR MOTORCYCLES

TECHNICAL FIELD

This application relates to a motorcycle. In particular, it relates to a motorcycle with a modular fastening system between its monocoque and a component.

BACKGROUND

Motorcycles are typically built around a frame to which other structural elements such as the headstock and the swingarm are permanently fixed. Building motorcycles with a frame construction may be costly, complex, or heavier than desired. In a traditional motorcycle, the steering head or headstock is connected to the upper front part of the frame and the swingarm is connected to the lower rear portion of the frame. Some motorcycles are made with a monocoque chassis, for example using sheet material of 1.5 mm thickness. Where a monocoque is present, the monocoque may be made of aluminum, steel, or carbon fibre and is used as a stressed member as part of the vehicle chassis.

SUMMARY OF INVENTION

The purpose of the present invention is to provide a fastening system for fixing the headstock of a motorcycle onto a monocoque structure. The fastening system is multi-modal and provides the motorcycle with different riding configurations. The headstock of the motorcycle can be placed in various positions on the motorcycle to modify the overall riding configuration. The structural elements of the fastening system are made in such a way that the fixation and position changes of the headstock on the monocoque of the motorcycle are simple for the user to carry out.

Disclosed is a fastening assembly for a motorcycle comprising: a track on a monocoque of the motorcycle, the track defining a channel; a foot piece in the channel, the foot piece movable along the channel; a plate; and a fixing device that fastens the plate and the foot piece to the track in a fixed position. In some embodiments, the plate is part of a headstock.

Also disclosed is a motorcycle comprising a monocoque, a headstock, and a fastening assembly, the fastening assembly comprising: a track on the monocoque, the track defining a channel; a foot piece in the channel, the foot piece movable along the channel; and a fixing device that fastens the foot piece and the headstock to the track in a fixed position.

BRIEF DESCRIPTION OF DRAWINGS

The following drawings illustrate embodiments of the invention, which should not be construed as restricting the scope of the invention in any way.

DESCRIPTION

A. Exemplary Embodiments

Figure 1:
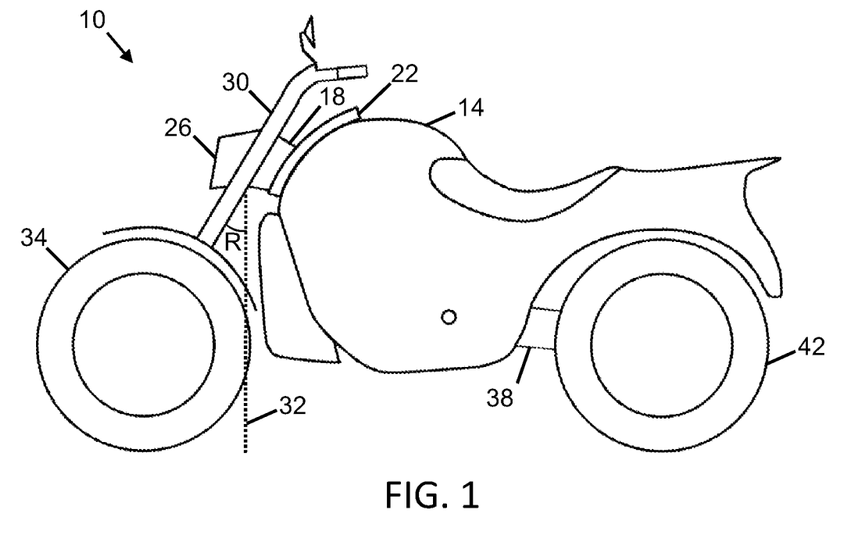
FIG. 1 is a schematic side view of an electric motorcycle in a dirt bike configuration, according to an embodiment of the present invention.

FIG. 1 shows motorcycle 10 in a dirt bike or sport bike configuration. It has a monocoque 14 with a head tube, headstock tube, or headstock 18 mounted on a track or guided rail 22 located at the front of the monocoque. The headstock 18 has a mounted front light 26. A front fork 30 with a front wheel 34 is fixed in the headstock 18 and onto the monocoque via the track 22. For the purpose of this example, the length of the track 22 is about 0.3 m.

The monocoque 14 hosts the motor and gears or gearbox of motorcycle 10. The material from which the monocoque 14 is made is chosen for structural, performance, cost, and manufacturing reasons. Materials such as die cast aluminum, magnesium, gravity cast aluminum, and sand cast aluminum are possible and may be selected for the monocoque 14. Machined billet aluminum, forged aluminum, formed aluminum, and formed and welded aluminum are also possibilities. At the rear of motorcycle 10 there is a swingarm 38 with a rear wheel 42.

The position of the headstock 18 is adjustable along the top front face of the monocoque 14. The headstock 18 may be fixed at various positions, in one position at a time, on the track 22 located on the top front face of the monocoque 14. In some embodiments, the positions may vary in a continuum from one end of the track 22 to the other. In other embodiments, the positions may be limited to several predetermined positions spaced apart by steps. When the headstock 18 is fixed at the lowest and at the most forward position on the top front of the monocoque 14, the front wheel 34 is closer to the rear wheel 42 compared to a motorcycle in a cruiser configuration. At the same time, the monocoque 14 is more elevated from the ground and provides motorcycle 10 with a higher ground clearance that is suitable for a dirt bike configuration. In conjunction with this, the rear suspension may be raised compared to the cruiser configuration. In some embodiments, however, the ground clearance of motorcycle 10 stays the same for every configuration. The rake angle, i.e. the angle between the front fork and the vertical 32, viewed from the side, is shown as angle R. The rake angle R for the sport bike configuration of motorcycle 10 is, for example, 24.5 degrees.

Figure 2:
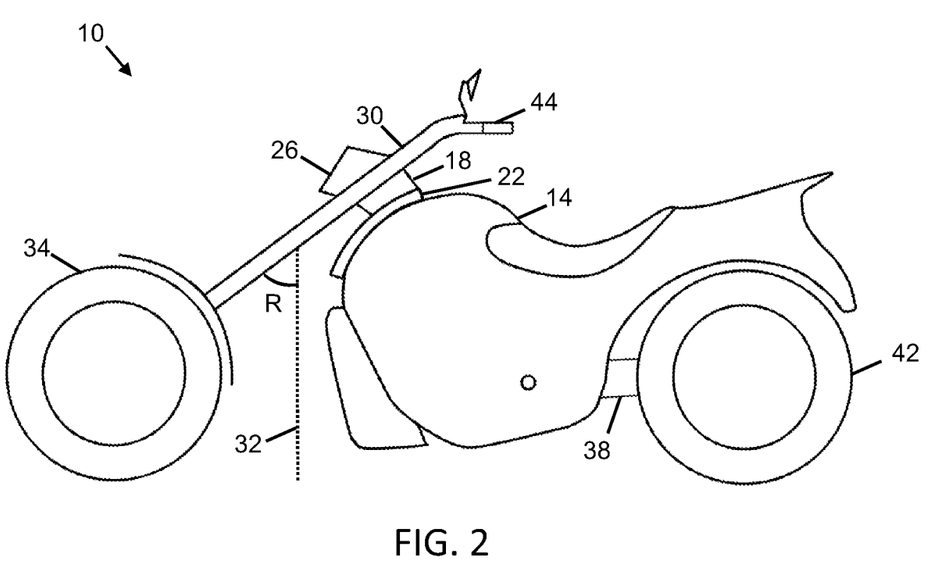
FIG. 2 is a schematic side view of an electric motorcycle in a cruiser configuration, according to an embodiment of the present invention.

FIG. 2 shows motorcycle 10 in a cruiser configuration. In this configuration, the front wheel 34 is set further away from the rear wheel 42 compared to motorcycle 10 in a dirt bike configuration. The headstock 18 is positioned and fixed in the highest and the most backward position on the track 22 located on the top front face of the monocoque 14. This way, the monocoque 14 of the motorcycle is positioned closer to the ground. This provides a smaller ground clearance to motorcycle 10. The handlebars 44 of the front fork 30 are sufficiently elevated from the monocoque 14 for proper use. In this configuration, the rider has a better riding position for long distance trips than in the sport bike configuration. The rake angle R between the front fork 30 and the vertical 32 is 30 degrees for the cruiser configuration.

For the adventure configuration, the rake angle is 27.5 degrees, for the naked configuration it is 24 degrees, and for the sport bike configuration the rake angle is either 24 or 24.5 degrees. Therefore, the fastening system allows for several possible vehicles from one headstock and one frame design.

When changing from one configuration to another, the suspension may need to be adjusted. The change in the angle of the headstock 18 denotes a different style of motorcycle 10 hence its suspension needs to be matched for each new configuration. The height of the suspension may be changed, the swingarm 38 angle may be adjusted, and/or different length forks 30 or a telescopic fork with the corresponding shock may be used. In some embodiments, an electromechanical switch is added to act as a limit sensing device, or an electromechanical measuring device is used to measure the position of the headstock 18 which can be used to determine the angle R between the vertical 32 and the shaft of the fork 30.

Figure 3:
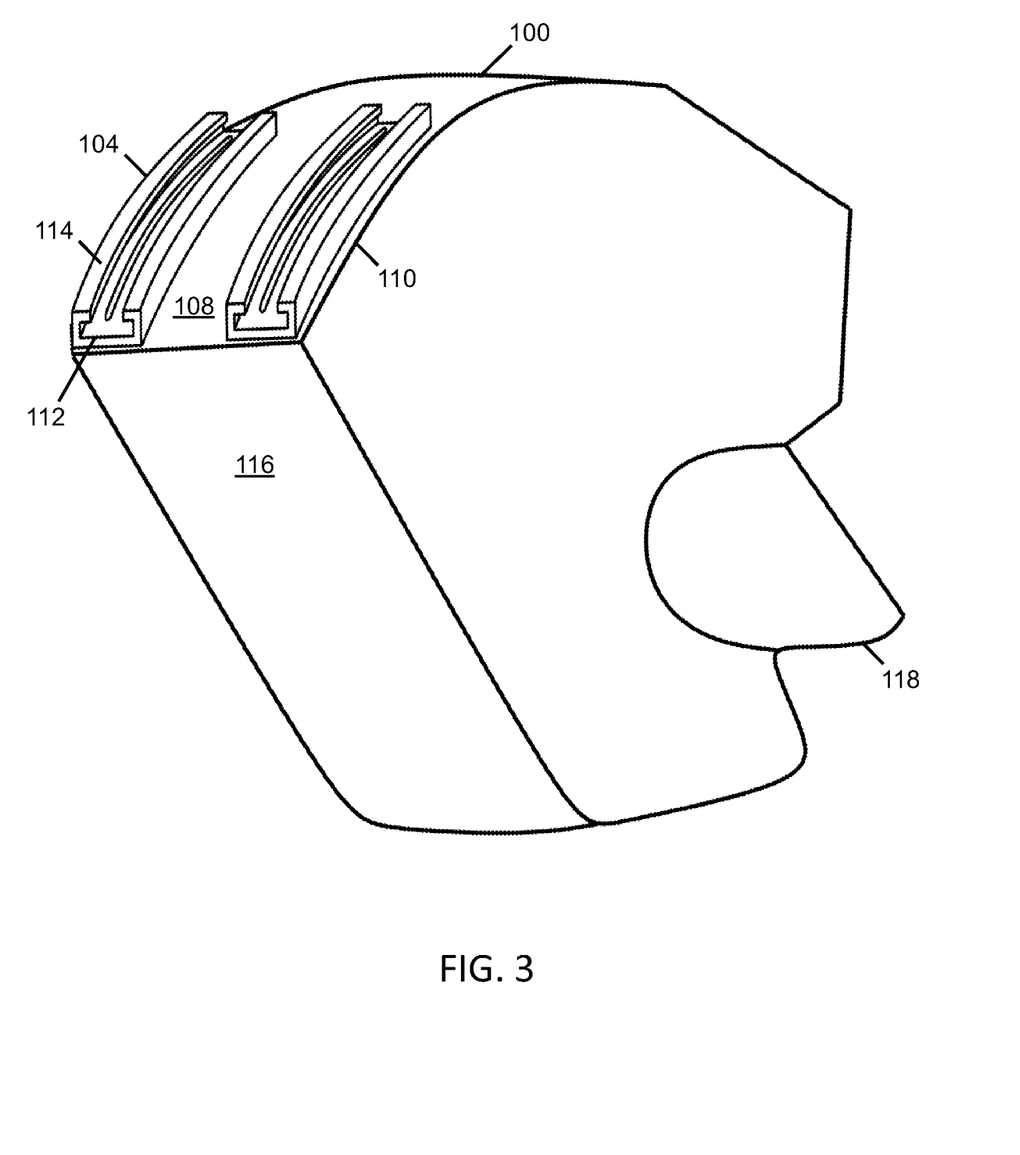
FIG. 3 is a schematic perspective view of the monocoque of an electric motorcycle with a fastening device according to an embodiment of the present invention.

FIG. 3 shows the monocoque 100 of the motorcycle with the tracks 104 of the fastening system and a housing 118 for the motor and/or gearbox. The tracks 104 of the fastening system are fixed on the top face 108 of the monocoque 100 of the motorcycle. The tracks 104 are positioned at the front of the top face 108 and are conformal with it. For example, the tracks 104 maintain a uniform spacing from the lateral edges 110 of the top face. The face 108 of the monocoque in this case is convex, but in other embodiments it may be concave or planar. The tracks 104 may or may not be conformal to the face 108 of the monocoque. In this example, the tracks 104 are curved blocks with a channel 112 in each accessed through at least one of the ends of the tracks. The channel in each of the tracks is an inverted T-slot. The channel is open at the front face 114 of the tracks 104, distal from the monocoque, and extends to the two ends of the track. Note that the use of "front" to describe the orientation of the tracks 114 is in relation to the motorcycle of which the monocoque 100 is a part.

The tracks 104 are screwed onto the top surface 108 of the monocoque 100. In other embodiments, the tracks 104 are welded on, or the monocoque is cast and then machined so that the tracks and monocoque surface 108 are in one piece. In some embodiments, the monocoque 100 of the motorcycle is the battery pack. In cases where the monocoque is split into two shells, each shell may be of unitary construction with one of the tracks 104. The monocoque 100 may have internal or external reinforcement features, such as ribs, to which the tracks 104 are connected. Other structural features may be incorporated to help bear mechanical stress.

The tracks 104 are curved or arced and follow the curvature of the convexity of the top face 108 of the monocoque 100. In some embodiments, the tracks 104 are linear in order to adjust to a flat top face 108 of the monocoque. If the tracks are linear, the rake angle R will not be changed as the position of the headstock is changed, however, the height of the motorcycle above the front wheel will be changed, as will be the wheelbase. While shown as convex here, the tracks may be concave in other embodiments. If concave, the curvature of the tracks may be such that as the position of the headstock is changed, the wheelbase and the rake angle are changed, but the height of the motorcycle remains constant.

In some embodiments, one larger track is used to fix the headstock. In other embodiments, more than two tracks 104 are used to fix the headstock. The distance between the two tracks 104 is, for example between 0.1 and 0.3 m. In some embodiments, the tracks 104 are connected across both the front face 116 and the top face 108 when the convex top face merges with the front face. In other embodiments, the tracks 104 are fastened and connected to each other, or are formed as a unitary piece.

In some embodiments, the front face 116 of the monocoque is removable. The monocoque 100 may be closed with the use of tamper-proof screws, or other security measures may be employed to close the monocoque. When the front face 116 of the monocoque 100 is removed, the user or manufacturer can access underneath the top face 108 of the monocoque in order to attach the tracks 104 to the monocoque. The tracks 104 are the primary fixing points for the headstock of the motorcycle, and a manufacturer or user of the motorcycle may access underneath the top face 108 of the monocoque 100 in order to fasten the headstock of the motorcycle onto the monocoque 100 via the tracks.

Figure 4:
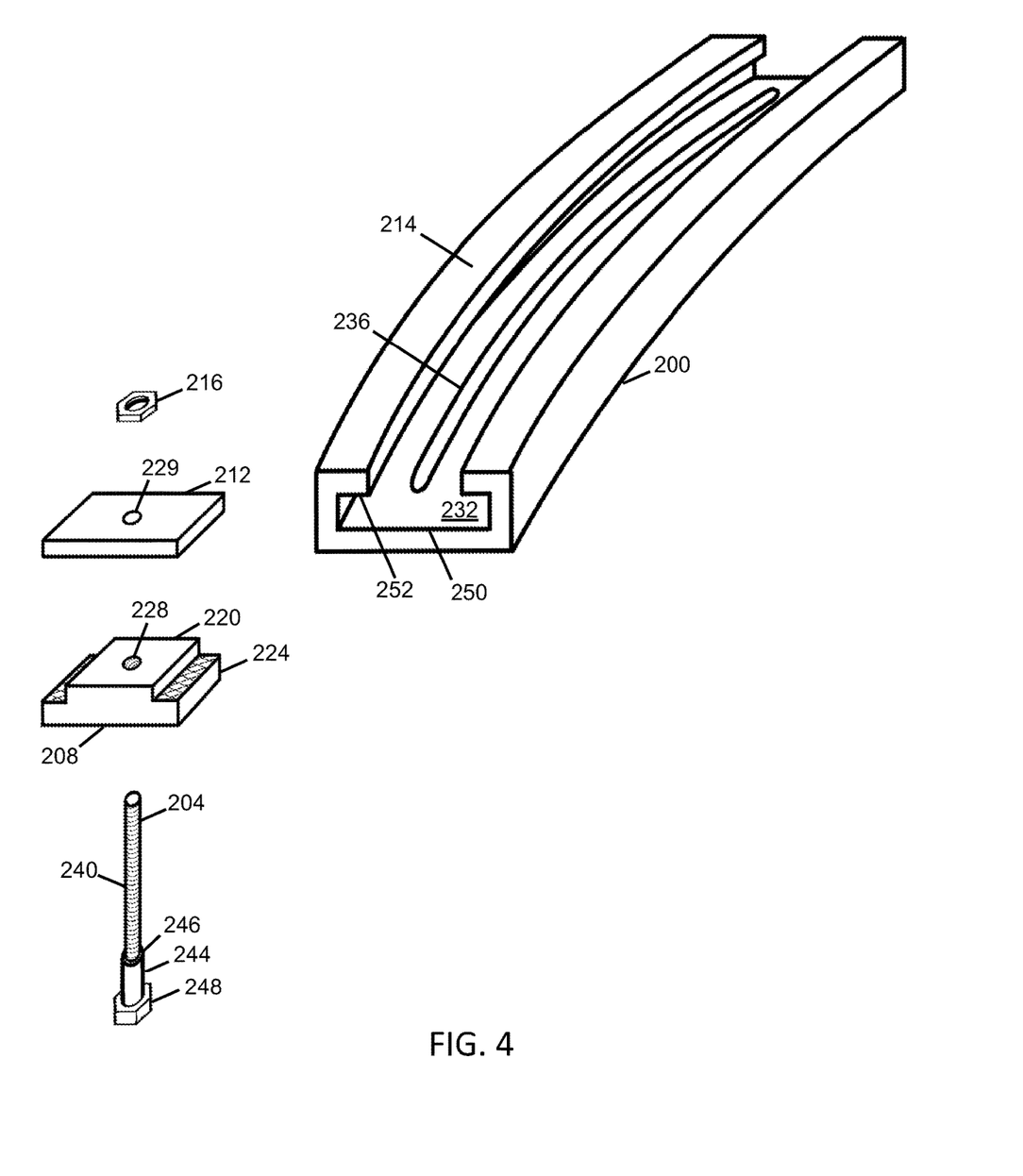
FIG. 4 is a schematic exploded view of a fastening system according to an embodiment of the present invention.

FIG. 4 shows one particular example of an assembly of the fastening system with a track 200, a shoulder screw 204, a foot piece 208, a plate 212, and a hexagonal nut 216. The plate 212 may be part of the headstock, or the headstock may have a projecting plate that is sandwiched between the plate 212 and the upper surface 214 of the track 200.

The foot piece 208 is inserted into the track 200 via one of the ends of the track. The foot piece 208 has a central part 220 and two lateral shoulders 224 that are each covered with knurled teeth on their top surface. The central part 220 is thicker than the shoulders 224 and has a threaded hole 228 in its center. In some embodiments, the foot piece 208 is made of stainless steel, aluminum or aluminum alloy.

The bottom face of the foot piece 208 is in sliding contact with the floor 232 of the track as it is pushed into the track 200 until it reaches the desired fixing distance. The foot piece 208 moves along the track 200 in an arc. The foot piece 208 has a cross-section that is complementary to the inverted T-slot 250 in the track 200.

The shoulder screw 204 is inserted into the slot or hole 236 of the track 200 from underneath. In some embodiments, the slot 236 is superimposed over a corresponding slot in the top face of the monocoque.

The shoulder screw 204 has a threaded part 240, a shoulder part 244, and a hexagonal head 248. The shoulder part 244 of the shoulder screw is inserted into both the slot of the monocoque and the slot 236 of the track, at the position of the foot piece 208. The width of the slots is large enough to let the shoulder part 244 go through both slots. In some embodiments, another type of screw may be used to retain the foot piece 208 inside the track 200. In other embodiments, washers, and/or spacers are added to enhance the strength and the stability of the fastening system.

The threaded part 240 of the shoulder screw 204 is screwed into the threaded hole 228 of the central part 220 of the foot piece 208 until the top face (the shoulder) 246 of the shoulder part 244 of the shoulder screw comes into contact with the bottom face of the foot piece 208. The shoulder part 244 of the shoulder screw 204 is wide enough that the shoulder surface 246 provides for sufficient contact area with the foot piece 208. When the shoulder screw 204 and the foot piece 208 are connected and tightened to each other, they can be moved as a single unit along the track 200.

The plate 212 with hole 229 is placed over the threaded part 240 of the shoulder screw 204 and then tightened with the hexagonal nut 216. In some embodiments, the plate 212 may project from the body of the headstock, or a projection from the headstock may be sandwiched between the plate and the top 214 of the track. As the nut 216 is tightened, the shoulders 224 of the foot piece 208 are raised into contact with the ceilings of the lateral overhangs or ceilings 252 of the track. The ceilings 252 of the track 200 are knurled, therefore the shoulders 224 of the foot piece 208 become locked with the ceilings 252 of the track. As a result, this mechanically locates and locks the foot piece 208 at a particular position in the track 200.

Figure 5:
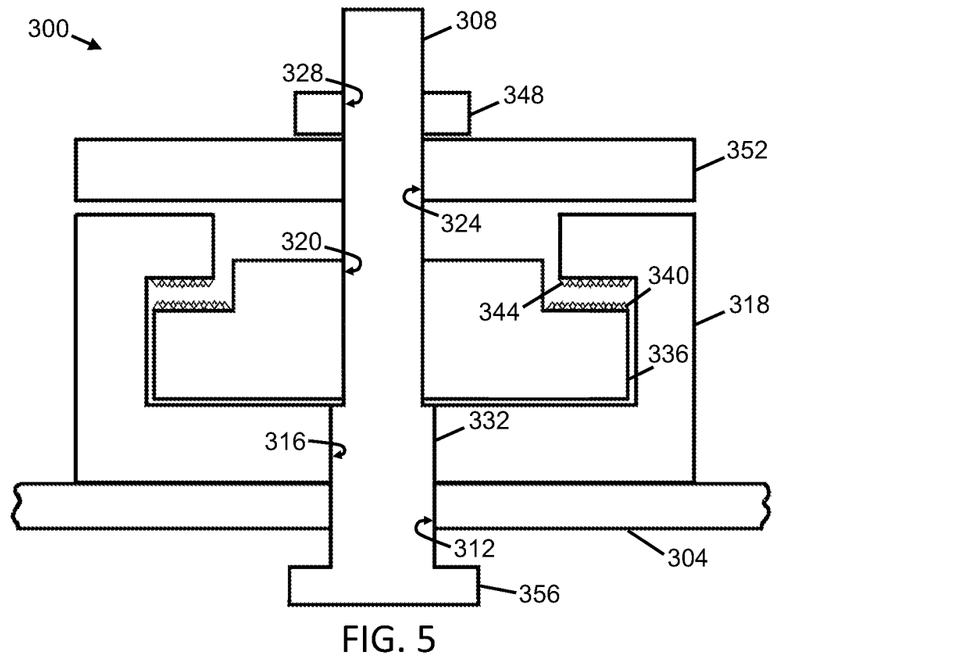
FIG. 5 is a schematic cross-sectional end view of the assembly of the fastening system according to an embodiment of the present invention.

FIG. 5 shows an assembly of a fastening system 300 of the motorcycle mounted on the monocoque 304. The shoulder screw 308 is inserted in the slot 312 of the monocoque 304, the slot 316 located in the floor of the track 318, the threaded hole 320 in the central part of the foot piece 336, the hole 324 of the plate 352, and the threaded hole 328 of the hexagonal nut 348. When fully fastened, the upper surface of the shoulder 332 of the shoulder screw 308 and the threads between the shoulder screw and the foot piece 336 lift the bottom face of the foot piece until the shoulders 340 of the foot piece, covered with knurled teeth, reach the lateral ceilings 344 of the track 318, also covered with knurled teeth. When the nut is tightened, it lifts the combination of the shoulder screw 308 and the foot piece 336 as one. The position of the foot piece 336 is set by the knurled surfaces 340, 344 and the hexagonal nut 348 fastened over the plate 352, which may be a plate projecting from the headstock.

The knurled teeth on the lateral ceiling 344 of the track and on the shoulders 340 of the foot piece are gripped together to secure the position of the foot piece 336 along the track 318, and to minimize or prevent possible movements. In this embodiment, the track 318 is directly welded to the monocoque 304. In some embodiments, additional fastening elements secure the fixing of the track 318 to the monocoque 304.

Mechanical stress or wear on the knurled teeth on the ceilings 344 of the track and the shoulders 340 of the foot piece, and the tightness of the nut 348 are periodically inspected. For example, the tightness of the nut 348 is inspected to ensure that it has the required torque for retention. The shoulder part 332 of the shoulder screw 308 is long enough so that the head 356 of the screw does not tighten onto the monocoque 304 when the screw is tightened to the foot piece 336. The shoulder screw 308 slides along the slots 312 and 316 allowing any position of the foot piece to be chosen. In some embodiments, a castellated nut is used to prevent the fastening system from loosening.

Figure 6:
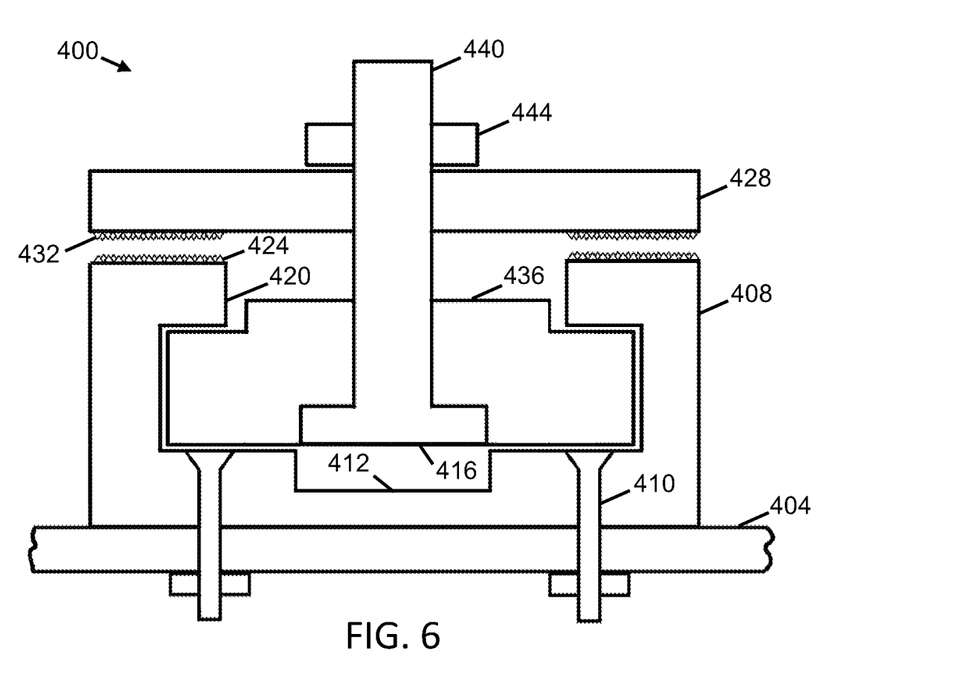
FIG. 6 is a schematic cross-sectional end view of the assembly of the fastening system according to another embodiment of the present invention.

FIG. 6 shows another embodiment of the fastening system 400 of the motorcycle mounted on the monocoque 404. The track 408 is bolted onto the top surface of the monocoque 404 using screws 410. The track 408 has a gutter 412 in its bottom floor that does not extend to the ends of the track. The gutter 412 of the track is configured to host the head 416 of the screw, which has a hexagonal shape.

The lateral overhangs 420 of the track 408 have knurled teeth 424 on their front (in relation to the motorcycle) or outer surface, i.e. the surface distal from the monocoque. The bottom face of the plate 428, which may be part of headstock, is covered correspondingly with knurled teeth 432. When the fastening system 400 is assembled with the foot piece 436 positioned inside the track 408 and the screw 440 pushed through the foot piece 436, with the plate 428 and the top nut 444 screwed on, the knurled teeth 424 of the outer surface of the track and the knurled teeth 432 of the bottom face of the plate are gripped together. This increases the stability of the fastening system 400 and helps prevent the foot piece 436 from moving over time.

The shape, size, and dimensions of the gutter 412 are chosen in such a way that the head 416 of the screw fits and is secured from rotating in the gutter when tightening or loosening the nut 440. For example, opposing parallel sides of the head 416 are in sliding contact with the sides of the gutter 412. A similar or hexagonal recess in the bottom of the foot piece 436 prevents rotation of the screw 440 (by holding the head 416 with the track/foot, the nut 444 can be tightened without needing a separate tool for holding the head).

Figure 7:
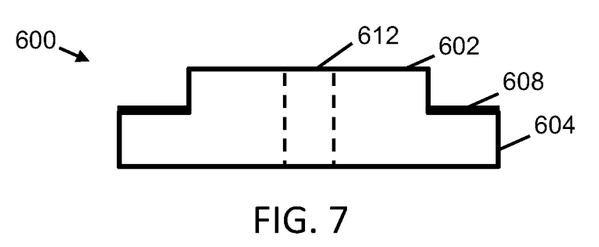
FIG. 7 is an end view of a foot piece of the fastening system according to an embodiment of the present invention.
Figure 8:
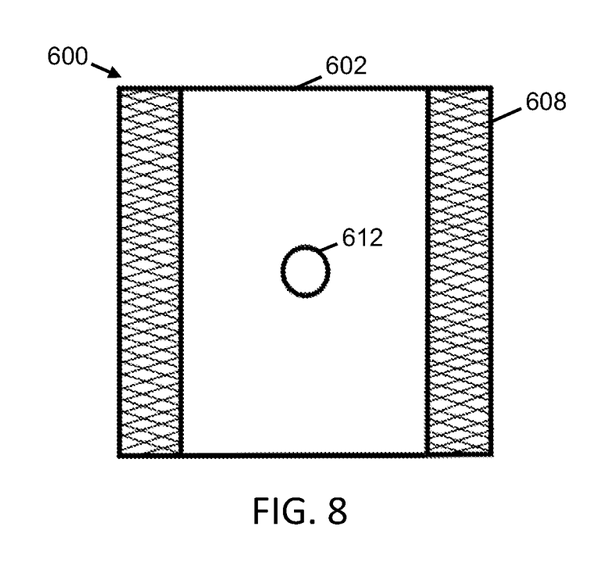
FIG. 8 is a top view of a foot piece of the fastening system according to an embodiment of the present invention.
Figure 9:
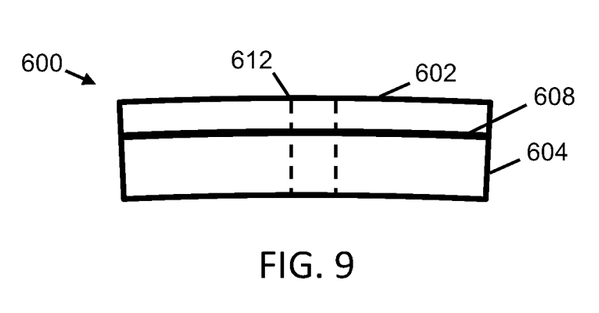
FIG. 9 is a side view of a foot piece of the fastening system according to an embodiment of the present invention.

FIGS. 7-9 show an example of the foot piece 600 of the fastening system. The foot piece 600 is a block which has a rectangular or square shape. Dimensions and proportions of the foot piece may be chosen by known engineering principles. The foot piece 600 has a central part 602 with two lateral shoulders 604. The upper surface of the shoulders 604 is covered with knurled teeth 608. The central part 602 has a threaded, or unthreaded depending on the embodiment, hole 612 in its center that can host the threaded part or shaft of a screw, not shown here. The foot piece 600 is slightly arced or curved, as visible in FIG. 9, in order to fit the curvature of the track of the fastening system. For example, the arc of the foot piece may span an angle of 0.5 degrees, and depends on the curvature of the track and the length of the foot piece in the direction of the track's channel.

Figure 10:
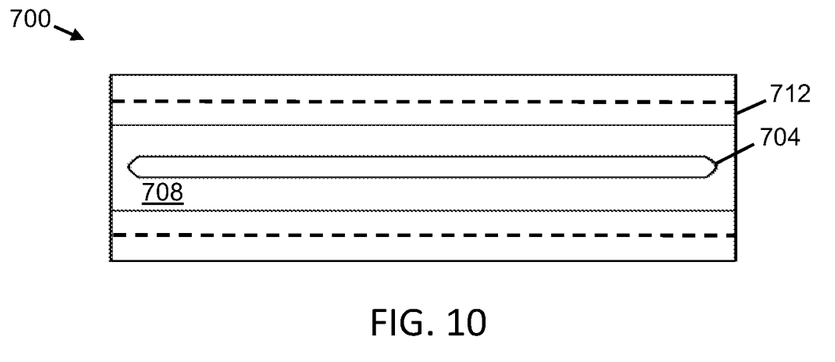
FIG. 10 is a top view of the track piece of the fastening system according to an embodiment of the present invention.
Figure 11:
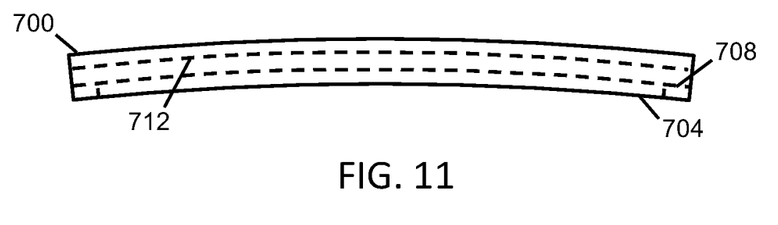
FIG. 11 is a side view of the track piece of the fastening system according to an embodiment of the present invention.

FIGS. 10 and 11 show a track 700 seen from the front (or above) and from the side, respectively. The track 700 has a slot 704 in its bottom floor 708. On each side of the track 700 there are lateral overhangs 712. The track 700 is arced in order to conform to the curvature of the convexity of the monocoque of the motorcycle, and more importantly to provide for the desired change in rake angle from one end of the track to the other. For example, the curvature of the track may cover an arc of 10 degrees. In another example, the curvature of the track, when mounted on the monocoque, may allow the rake angle to be adjusted anywhere from 24 to 30 degrees.

In some embodiments, the slot 704 has narrowed portions or restrictions along its length in between wider portions that provide a limited number of predetermined fixation points. The screw has a corresponding narrowed portion that can pass along the track through the restricted zones when loosened and lowered, but not when tightened or raised. In other embodiments there may be other mechanical features included that provide registration points for limiting the position of the foot piece to a discrete number of predetermined locations. As such, the plate and the foot piece are fastenable at a plurality of different predetermined positions on the track. In other embodiments, the track 700 has additional fixation feet on its side in order to reinforce the fixation of the track to the monocoque of the motorcycle.

Figure 12:
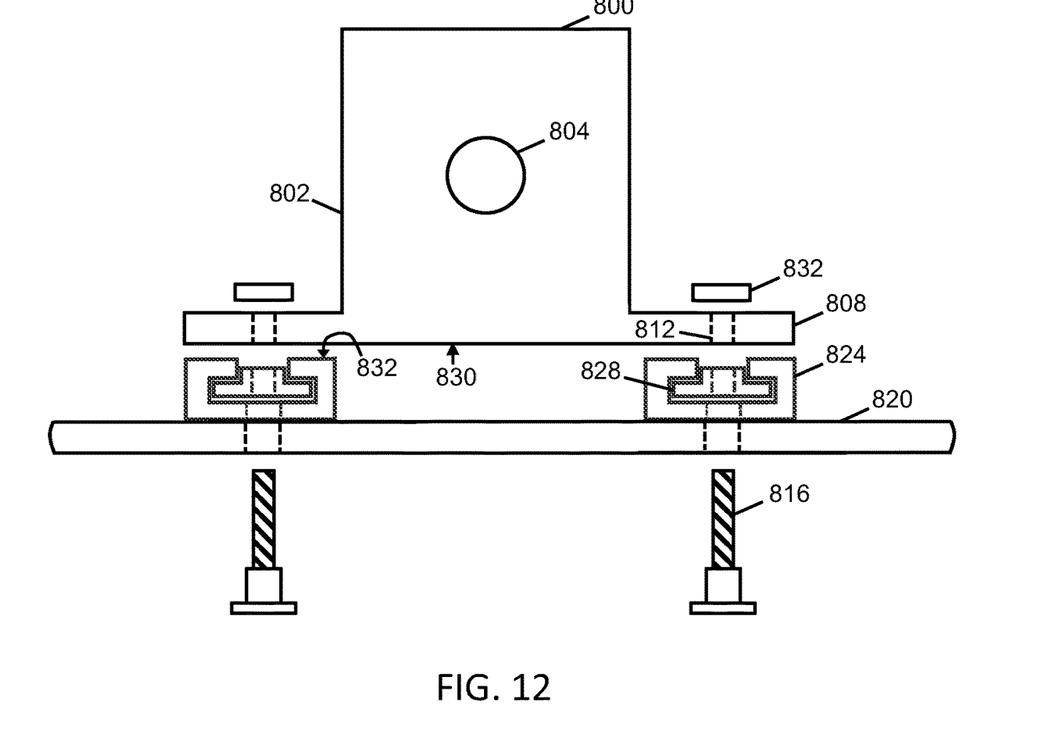
FIG. 12 is a schematic drawing representing the fastening system with the monocoque and the headstock of the motorcycle seen from underneath or above the headstock, according to an embodiment of the present invention.

FIG. 12 shows the fastening system with the headstock 800 of the motorcycle. The headstock 800 has a large block 802 with a central hole 804. The hole 804 of the headstock hosts the front fork of the motorcycle. On each side of the block 802 there are two shoulder plates or shoulders 808. Each of the shoulders 808 of the headstock has a through-hole 812 in its center for housing the threaded part of the shoulder screw 816. The shoulder screw 816 is screwed into the foot piece 828. The nut 832 is then screwed onto the screw. The headstock 800 is therefore fastened to the track 824 and monocoque 820 via its side plates 808. The lower surface 830 of the headstock 800 may be curved in order to conform to the curvature of the outer surface 832 of the tracks 824.

Figure 13:
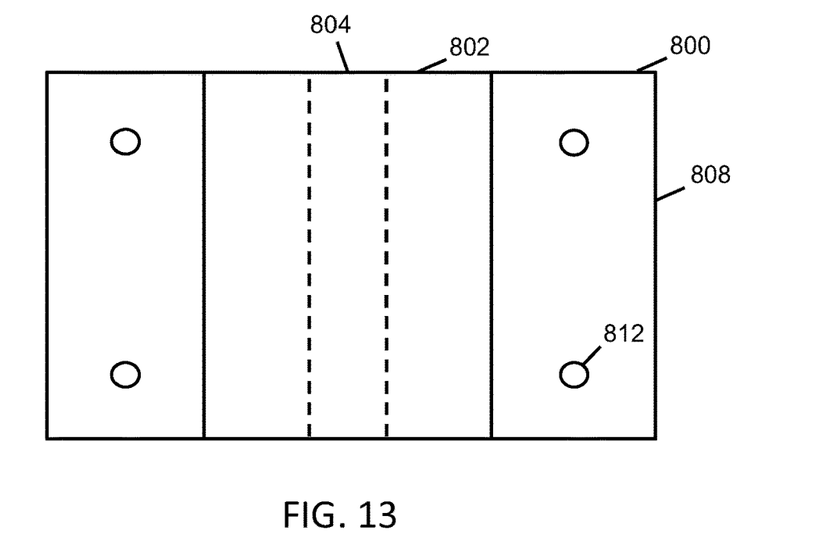
FIG. 13 is a schematic drawing representing the headstock of the motorcycle seen from the front of the motorcycle, according to an embodiment of the present invention.

FIG. 13 shows a front view of the headstock 800, as seen from the front of the motorcycle. The headstock 800 has a central block part 802 having a hole 804 to host the front fork of the motorcycle. On each side of the central block 802 there is a shoulder plate 808. Each shoulder plate 808 has two fixation holes 812. These fixation holes 812 are used to fix the headstock 800 onto the tracks 824 of the fastening system. The two fixation holes 812 on each shoulder plate 808 are spaced 0.1-0.3 m apart.

B. Variations

While specific embodiments for carrying out the subject matter disclosed and claimed herein have been described, other variations are also possible.

In some embodiments, the gutter and/or slots of the monocoque and the track may be omitted, while still allowing the foot pieces and headstock to be secured in position to the tracks. In some embodiments, the channel profile of the track is different.

In some embodiments, the fastening system is also used for other parts of the vehicle. For example, it may be used to fasten the swingarm 38 of motorcycle 10 to the monocoque 14. A range of angles of attachment of the swingarm 38 to the motorcycle may be provided by the fastening system, thereby providing a range of different heights to the rear suspension of the motorcycle.

In some embodiments, different fixing mechanisms may be used. For example, the screw may be inserted from the top or front of the track and tighten into a threaded hole in the foot piece. In this example, no nut is needed. In another example, a cam lever may be used as a fixing mechanism.

Knurling may be linear and perpendicular to the direction of movement of the foot piece, it may be diagonal, or it may be criss-crossed. Knurling may be present on only one of the two surfaces that are in contact with each other. Surfaces may be roughened by techniques other than knurling, e.g. by the formation of waves or other surface structures.

Although the present invention has been illustrated principally in relation to two-wheeled motorcycles, it has application in respect to three-wheeled motorcycles and quadricycles, planes, or other vehicles utilizing monocoque structures.

In general, unless otherwise indicated, singular elements may be used in other embodiments in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention claimed. Modules may be divided into constituent modules or combined into larger modules. All dimensions, proportions, materials, and configurations described herein are examples only and actual ones of such depend on the specific embodiment. Accordingly, the scope of the invention is to be construed in accordance with the substance defined by the following claims.

The invention claimed is:

1. A fastening assembly for a motorcycle, the fastening assembly comprising: a track on a monocoque of the motorcycle, the track defining a channel; a foot piece in the channel, the foot piece movable along the channel; a plate; and a fixing device that fastens the plate and the foot piece to the track in a fixed position selected from multiple possible fixed positions along the track, wherein the channel has an inverted T-section that is open to a side of the track distal from the monocoque.

2. The fastening assembly according to claim 1, wherein the plate is part of a headstock.

3. The fastening assembly according to claim 2, wherein the track is curved, allowing a rake angle of the motorcycle to be set between 24 and 30 degrees.

4. The fastening assembly according to claim 1, wherein the plate and the foot piece are fastenable at a plurality of different predetermined positions on the track.

5. The fastening assembly according to claim 1, wherein the track is concave.

6. The fastening assembly according to claim 1, wherein:
the foot piece is a rectangular block with two shoulders comprising knurled teeth on upper surfaces of the shoulders; and
the knurled teeth engage with other knurled teeth on overhangs of the channel.

7. The fastening assembly according to claim 1, wherein:
the track is formed in a curved block with a rectangular cross-section; and the channel is open to two ends of the track.

8. The fastening assembly according to claim 7, wherein:
the curved block defines overhangs over the channel; and
ceilings of the overhangs have knurled teeth.

9. The fastening assembly according to claim 8, wherein:
the foot piece has shoulders with upper surfaces that have further knurled teeth; and
the overhangs grip to the shoulders when the fixing device is tightened.

10. The fastening assembly according to claim 1, further comprising:
a second track on the monocoque of the motorcycle, the second track defining a second channel;
a second foot piece in the second channel, the second foot piece movable along the second channel;
a second plate; and
a second fixing device that fastens the second plate and the second foot piece to the second track in a second fixed position selected from multiple possible second fixed positions along the second track, wherein the plate and the second plate are parts of a headstock.

11. The fastening assembly of claim 1, wherein the fixing device is a screw.

12. The fastening assembly according to claim 11, wherein the screw screws into the foot piece and has a shoulder that supports the foot piece from underneath.

13. The fastening assembly according to claim 11, wherein the screw is inserted through the plate and screws into the foot piece.

14. The fastening assembly according to claim 1, wherein the foot piece has shoulders and the track has ceilings, and the shoulders engage with the ceilings when the fixing device is tightened.

15. The fastening assembly according to claim 1, wherein:
a bottom face of the plate has knurled teeth;
an outer face of the track has further knurled teeth; and
the knurled teeth and the further knurled teeth are in contact when the fixing device is tightened.

16. The fastening assembly according to claim 1, wherein the track is curved allowing a rake angle of the motorcycle to be varied within a range of 10 degrees.

17. A motorcycle comprising: a monocoque; a headstock; and a fastening assembly comprising: a track on the monocoque, the track defining a channel; a foot piece in the channel, the foot piece movable along the channel; and a fixing device that fastens the foot piece and the headstock to the track in a fixed position selected from multiple possible fixed positions along the track, wherein the channel has an inverted T-section that is open to a side of the track distal from the monocoque.

18. The motorcycle according to claim 17, wherein the track is curved, allowing a rake angle of the motorcycle to be varied by up to 10 degrees.

19. The motorcycle according to claim 18, wherein the rake angle can be set between 24 and 30 degrees.

20. The motorcycle according to claim 17, wherein the foot piece comprises a knurled surface.

21. The motorcycle according to claim 17, further comprising another fastening assembly identical to the fastening assembly.

* * * * *